United States Patent [19]

Horie et al.

[11] Patent Number: 5,675,737
[45] Date of Patent: Oct. 7, 1997

[54] MESSAGE RECEIVING SYSTEM FOR USE IN PARALLEL COMPUTER SYSTEM

[75] Inventors: Takeshi Horie; Hiroaki Ishihata, both of Kawasaki, Japan

[73] Assignee: Fujitsu Limited, Kawasaki, Japan

[21] Appl. No.: 682,478

[22] Filed: Jul. 17, 1996

Related U.S. Application Data

[63] Continuation of Ser. No. 214,744, Mar. 18, 1994, abandoned.

[30] Foreign Application Priority Data

May 14, 1993 [JP] Japan .................... 5-113043

[51] Int. Cl.[6] .................................... G06F 13/00
[52] U.S. Cl. .................... 395/200.07; 395/200.15; 395/200.16; 395/200.17; 395/842
[58] Field of Search ................ 395/200.07, 200.15, 395/200.16, 200.17, 842

[56] References Cited

U.S. PATENT DOCUMENTS

| | | | |
|---|---|---|---|
| 4,424,565 | 1/1984 | Larson | 364/200 |
| 4,443,850 | 4/1984 | Harris | 364/200 |
| 4,543,627 | 9/1985 | Schwab | 364/200 |
| 4,658,351 | 4/1987 | Teng | 364/200 |
| 4,797,853 | 1/1989 | Savage et al. | 364/900 |
| 5,047,917 | 9/1991 | Athas et al. | 364/200 |
| 5,058,110 | 10/1991 | Beach et al. | 370/85.6 |
| 5,140,583 | 8/1992 | May et al. | 370/60 |
| 5,265,261 | 11/1993 | Rubin et al. | 395/800 |
| 5,388,215 | 2/1995 | Baker et al. | 395/200 |
| 5,437,013 | 7/1995 | Rubin et al. | 395/200 |

FOREIGN PATENT DOCUMENTS

5-40616  2/1993  Japan .

*Primary Examiner*—Jack B. Harvey
*Assistant Examiner*—Valerie Darbe
*Attorney, Agent, or Firm*—Staas & Halsey

[57] ABSTRACT

A message receiving method communicates a message among a plurality of computers in a parallel computer system, shortens a delay time in storing a received message in a user area of a memory, and realizes overlap between receipt of a message and execution by a processor. Each computer in the parallel computer system comprises a message buffer for temporarily storing the received message and a message handler for receiving a receive-a-message request from a processor of a computer to which it belongs. If the receive-a-message request arrives before the arrival of the message, the message handler directly transmits the received message to a user area specified by the receive-a-message request. During the transmission period, the message handler prevents the processor from accessing a portion in the user area to which the message has not been transmitted yet.

17 Claims, 13 Drawing Sheets

| ADDRESS | MESSAGE TYPE | MESSAGE SIZE | ARRIVAL FLAG |

Fig. 6B

| ADDRESS | MESSAGE TYPE | COMPLETED |
|---------|--------------|-----------|
| ADDRESS | MESSAGE TYPE | COMPLETED |
|         |              |           |
| ADDRESS | MESSAGE TYPE | COMPLETED |

Fig. 9 ns of the message starts, the message
MESSAGE RECEIVING SYSTEM FOR USE IN PARALLEL COMPUTER SYSTEM This application is a continuation of application Ser. No. 08/214,744, filed Mar. 18, 1994, now abandoned.

BACKGROUND OF THE INVENTION

1. Field of the Invention

The present invention relates to a parallel computer system, and more specifically to a parallel computer system capable of overlapping between reception of messages transmitted over a network and an operation of a processor.

2. Description of the Related Art

Messages are required to be transmitted for communications at a high speed among a plurality of computers forming a parallel computer system. Important factors affecting the performance of message communications are the performance of a network connecting processors and a method of handling (sending and receiving) messages.

Figure 1:
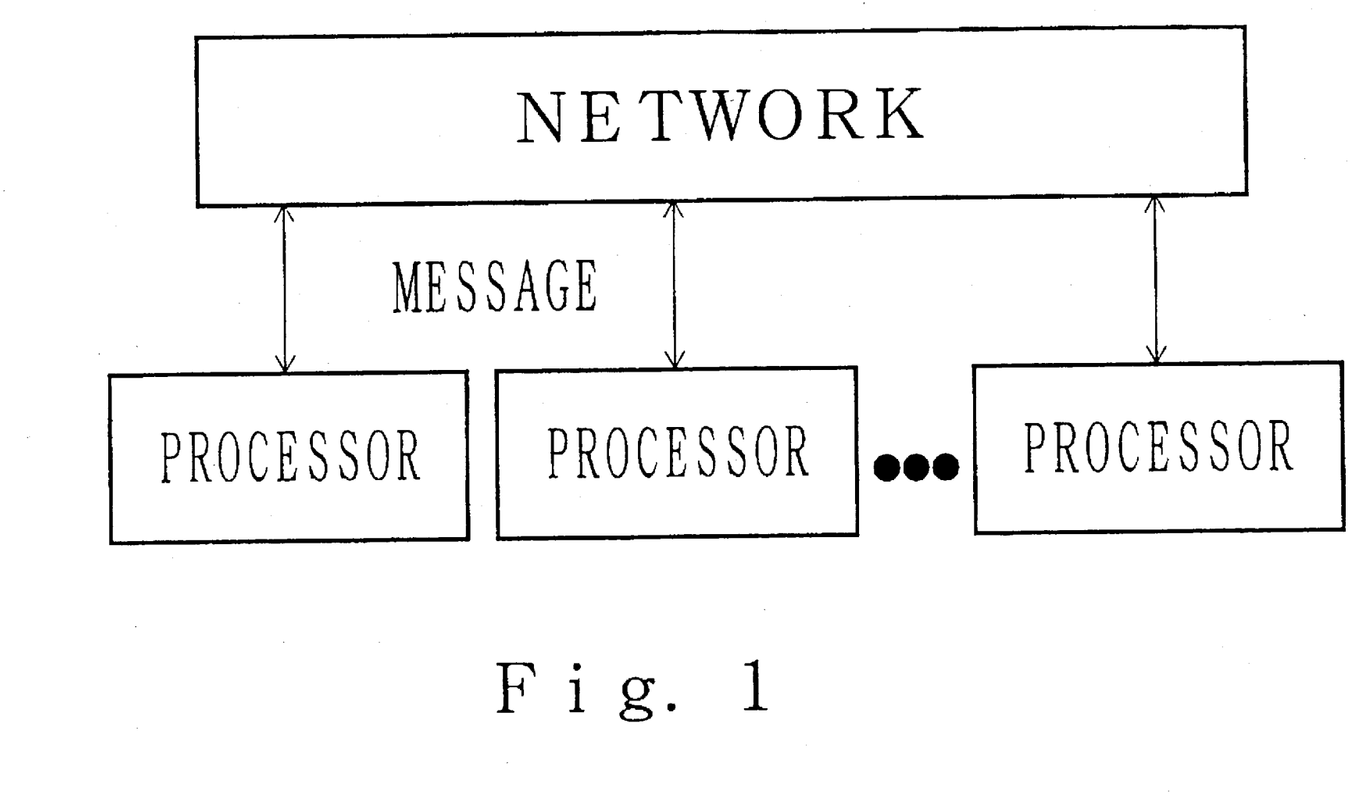
FIG. 1 shows an example of the configuration of a parallel computer system.

FIG. 1 shows an example of the configuration of the parallel computer system. Conventionally, when a processor in a parallel computer system receives a message over a network, the message is temporarily stored in a message buffer, and then copied to a data area of a user when required by the user.

In the above described conventional message receiving method, the user waits for the arrival of a message when the user requires the contents of the message and the message has not yet arrived through the network. Furthermore, the user still has to wait, even after the arrival of the message, for the message until it is temporarily stored in the message buffer and copied in the user's data area, thereby producing heavy overheads at the reception of a message.

Some conventional receiving systems determine depending on the type of message which is to be activated, a direct memory access controller (DMAC) for transmitting a message to a message buffer or a DMAC for transmitting it to a user's data area. However, with these system, an interruption arises from a network upon arrival of the message, and control is passed to a software process, thereby taking additional time for a message receiving process.

SUMMARY OF THE INVENTION

The present invention aims at reducing overheads at the reception of messages transmitted through the parallel computer system, and operating it overlapping between reception of a message by each computer and execution by a processor.

To attain the purpose, each of the computers in the parallel computer system for transmitting a message over a network comprises a message buffer and a message handler. The message buffer temporarily stores a message received from another computer over the network, and the message handler receives a request, from a processor provided in the computer to which the message handler belongs, to receive a message to be transmitted from another computer and to be temporarily stored in the message buffer according to the present invention.

With the present invention, the message handler performs different operations depending on the timing of receiving a receive-a-message request from a processor and on the timing of the actual arrival of a message over a network. First, if the message handler receives the receive-a-message request before the actual arrival of the message, it directly transmits the message to a user area at a memory address specified by the receive-a-message request at the arrival of the message without storing it in the message buffer.

If the transmission of the message starts, the message handler returns to the processor an acknowledge signal in response to the receive-a-message request, and prevents, through a check by an access area checking unit, the processor from accessing a portion in a user area to which the message is to be transmitted but not yet, thereby realizing overlap between reception of a message and execution by a processor.

Second, if a message has been stored in the message buffer when a receive-a-message request is received from a processor, the message handler transmits the message data stored in the message buffer to a user area, and simultaneously, as in the first case, prevents the processor from accessing a portion in a user area to which the message is to be transmitted but not yet.

Third, if a message is received over a network and is being transmitted to a message buffer when a receive-a-message request is received from a processor, a message handler starts transmitting the message from the message buffer to a user area at a specified memory address, and prevents, as in the first and second cases, the processor from accessing a portion in the user area to which the message is to be transmitted but not yet.

As described above, the present invention prevents a message from being delayed in transmission between the arrival over a network and the transfer to a user area, and also prevents a processor from accessing a portion in a user area to which the message is to be transmitted but not yet.

BRIEF DESCRIPTION OF THE DRAWINGS

One skilled in the art can easily understand additional features and objects of this invention from the description of the preferred embodiments and some of the attached drawings. In the drawings.

DESCRIPTION OF THE PREFERRED EMBODIMENTS

Figure 2:
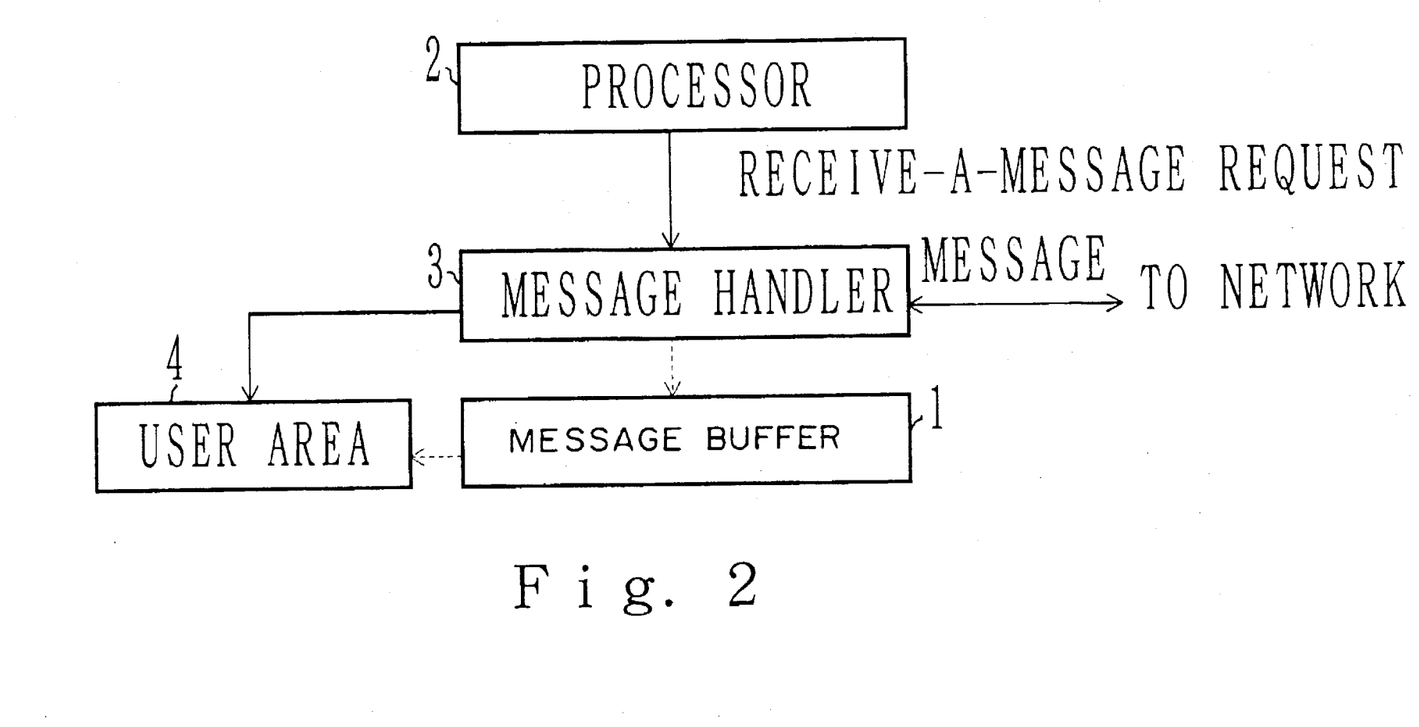
FIG. 2 is the block diagram showing the configuration of an embodiment according to the principle of the present invention.

FIG. 2 is the block diagram of the configuration of an embodiment according to the principle of the present invention. By referring to FIG. 2, explained is a method of receiving a message transmitted in the parallel computer system comprising a message buffer 1 for temporarily storing a received message.

In FIG. 2, a message handler 3 receives a receive-a-message request from a processor 2 in each computer, and is connected to a network of the parallel computer system. If the message handler 3 receives a receive-a-message request from the processor 2 before the actual arrival of the header of a message, then it directly transmits the message to a user area 4 at a memory address specified by the receive-a-message request at the actual arrival of the message.

Thus, according to the present invention, if a receive-a-message request is issued from the processor 2 to the message handler 3 before the actual arrival of the header of a message, then the message is directly transmitted to the user area 4 at the actual arrival of the message through a network without being stored in the message buffer 1, thereby reducing overheads for the transmission from the message buffer to the user area.

At this time, when the message handler 3 starts transmitting the message to the user area 4, it returns an acknowledge signal (ACK) in response to the receive-a-message request, and, for example, an access area checking unit provided in the message handler 3 prevents the processor 2 from accessing a portion in the user area to which the message is to be transmitted but not yet, thereby realizing overlap between reception of a message and execution by a processor.

On the other hand, if a message arrives before a receive-a-message request is issued by the processor 2, and if the message is completely transmitted to the message buffer 1, then the message handler 3 returns to the processor 2 an acknowledge signal in response to the receive-a-message request immediately after the message buffer 1 starts transmitting the message to the user area 4, and the access area checking unit prevents the processor from accessing a portion in the user area 4 to which the message is to be transmitted but not yet, thereby realizing overlap between reception of a message and execution by a processor.

Furthermore, if the header of a message arrives before a receive-a-message request is issued by the processor 2, and if the message is being transmitted to the message buffer 1, then the message buffer 1 starts transferring (copying) the message to the user area 4 on receipt of the receive-a-message request, and the transmission of message data inputted over the network to the message buffer 1 continues. Since an acknowledge signal is returned to the processor 2 in response to the receive-a-message request immediately after the message handler 3 has started transferring the message to the user area 4 and the processor 2 is prevented from accessing a portion in the user area 4 to which the message is to be transmitted but not yet as described above, the present invention realizes overlap between reception of a message and execution by a processor.

Figure 3:
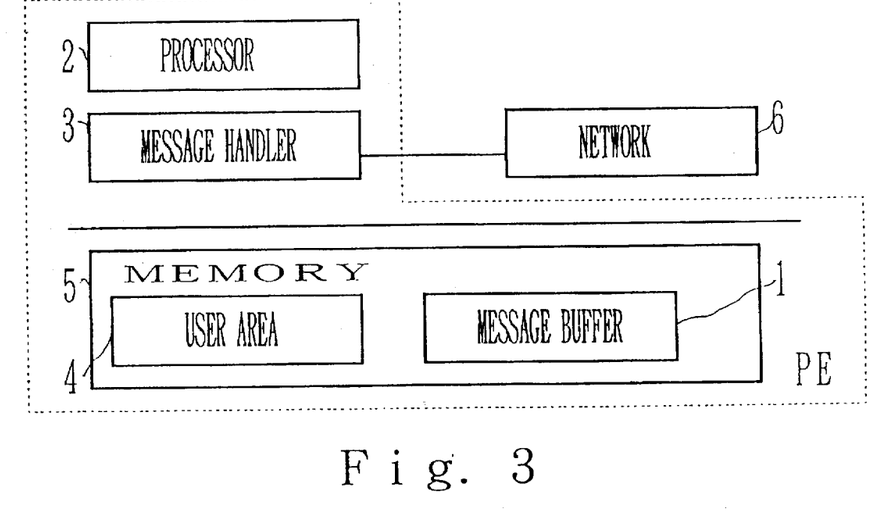
FIG. 3 is the block diagram showing the configuration of an embodiment of a processor element.

FIG. 3 is the block diagram of the configuration of an embodiment of each of the computers forming the parallel computer system, that is, the processor element (PE). In FIG. 3, the processor element (PE) comprises the processor 2, the message handler 3, and a memory 5. The message buffer 1 and the user area 4 are provided in the memory 5. The message handler 3 is connected to a network 6 which connects the PEs forming the parallel computer system to one another.

Figure 4:
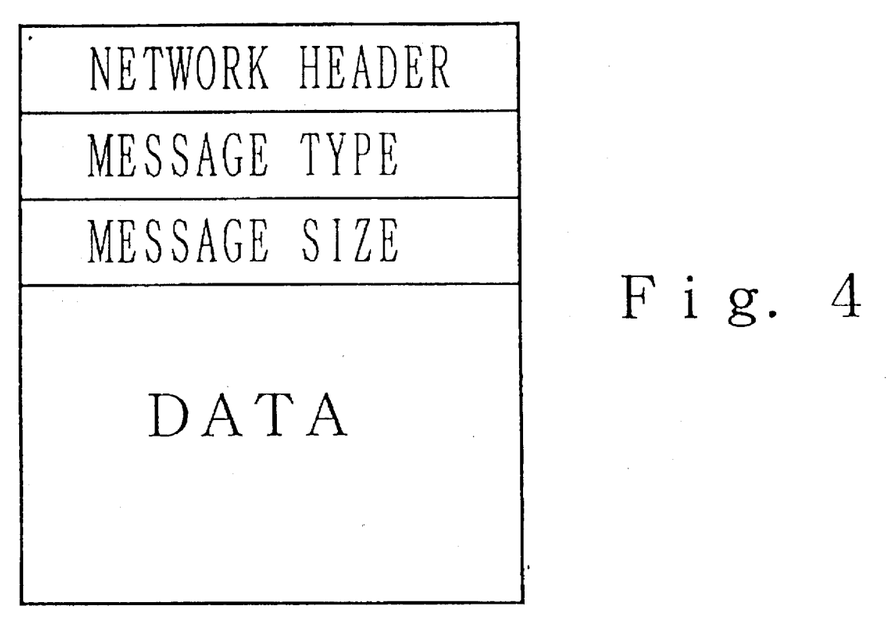
FIG. 4 shows an embodiment of the message format.

FIG. 4 shows an embodiment of the message format. A network header in FIG. 4, which is used by a network, is stripped off when a message arrives at the message handler 3 through the network 6 in FIG. 3, and the succeeding message type, message size, and data are received as an actual message. The network header, message type, and message size are 32 bits each in width. The message type can be represented in any format as long as they are in 32-bit units.

Figure 5:
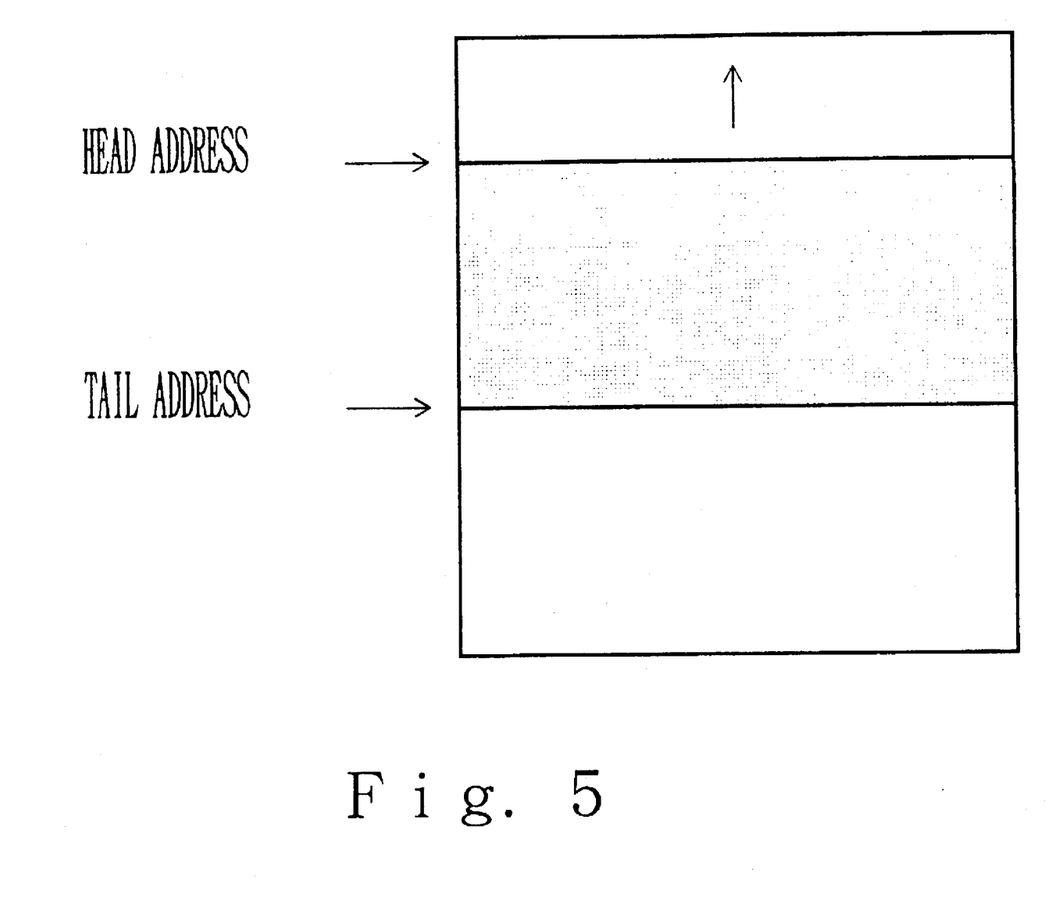
FIG. 5 illustrates a ring buffer as an embodiment of the message buffer.

FIG. 5 illustrates a ring buffer as an embodiment of the message buffer 1 shown in FIG. 3. In FIG. 3, a message entered through the network 6 is transmitted by the message handler 3 to an area specified by a head address of a ring buffer. When the stored message data are transmitted to a user area, the message storage area is released, and at this time, for example, the tail address is invalidated, and the area specified by the head address can store data again. The ring buffer is described as an embodiment because it can be easily realized as hardware.

Figure 6A:
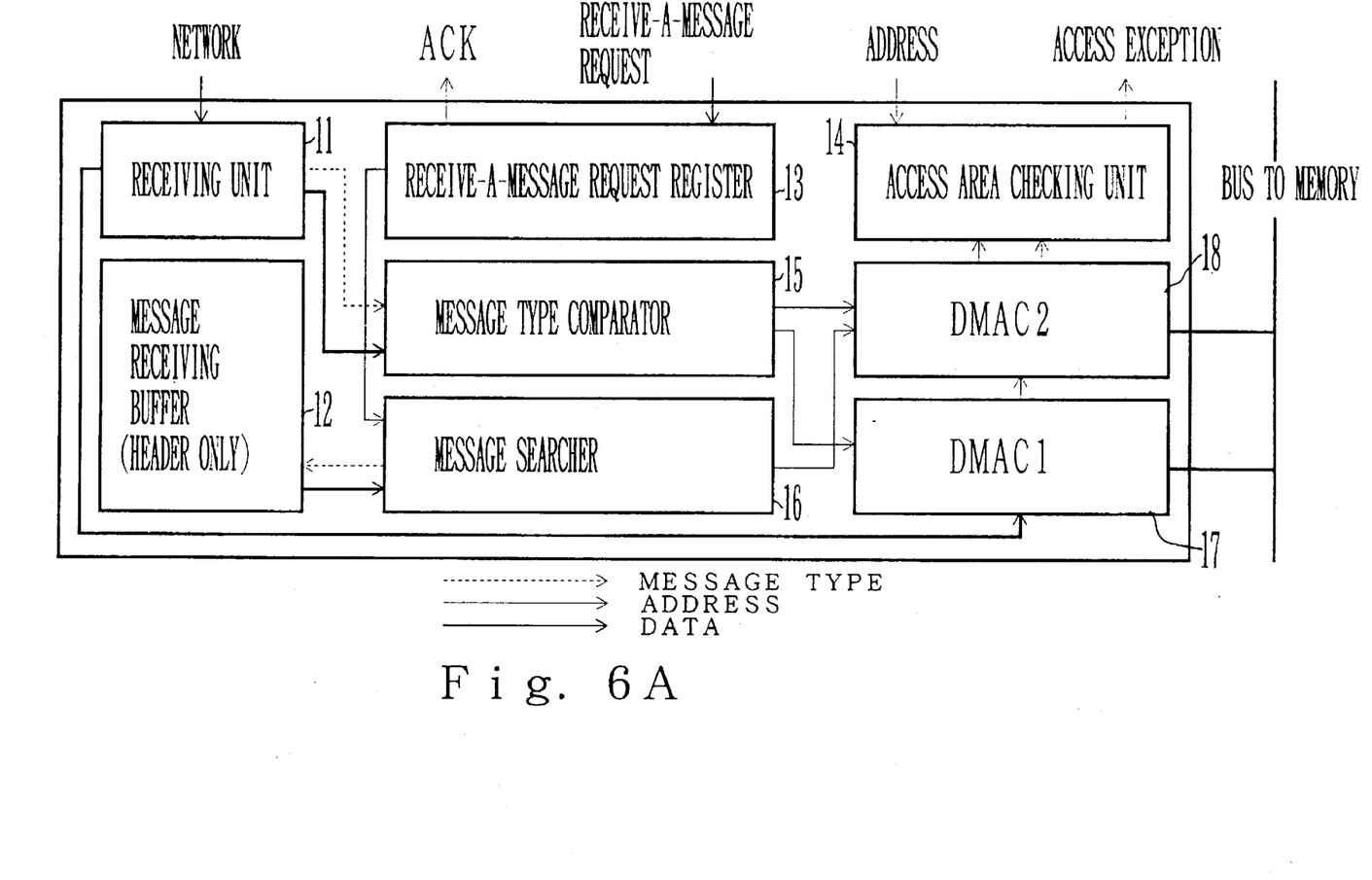
FIG. 6A is the block diagram of the configuration of the message handler.

FIGS. 6A through 6D show the message handler in detail. FIG. 6A is the block diagram of the configuration of the message handler. In FIG. 6A, the message handler comprises a receiving unit 11 for receiving a message through a network, a message receiving buffer 12 for receiving only a message header from the receiving unit 11, a receive-a-message request register 13 for receiving a receive-a-message request from a processor, an access area checking unit 14 for checking an access address of the processor, a message type comparator 15 for comparing the message type in the receive-a-message request from the processor with the message type of the message received through the network, a message searcher 16 for searching the message receiving buffer 12 for a message in response to an input through the receive-a-message request register 13, a first direct memory access controller (DMAC 1) 17 for transmitting a message received through the receiving unit 11 to the message buffer 1, and a second direct memory access controller (DMAC 2) 18 for controlling the transmission of message data to the user area 4 (including the transmission from the message buffer 1 and the direct transmission of a received message).

Figure 6B:
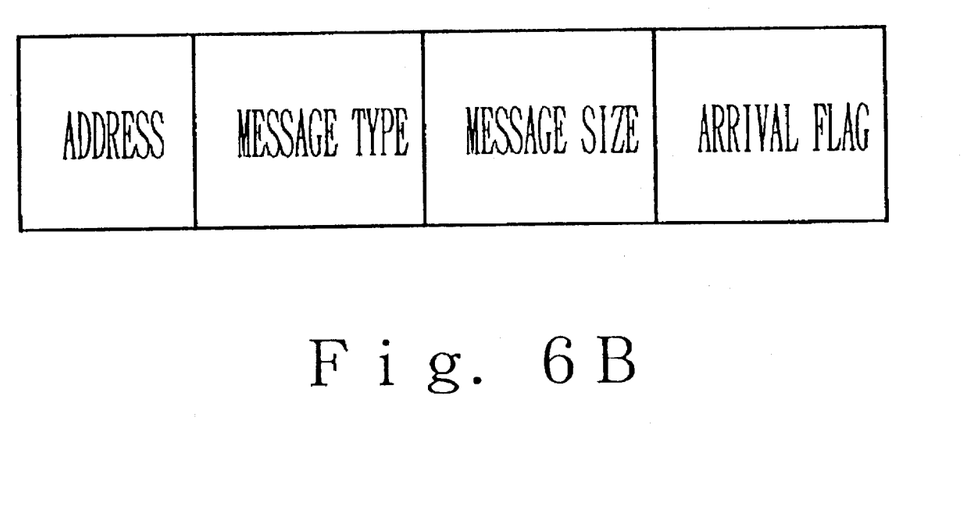
FIG. 6B shows the contents of the receive-a-message request register.

FIG. 6B shows the contents of the receive-a-message request register 13. In the contents, an address, a message type, and a message size are described in a receive-a-message request from the processor 2. An address is a memory address of the user area 4, and a message type indicates the type of a message required by a processor. An arrival flag is set at the arrival of a specified message.

Figure 6C:
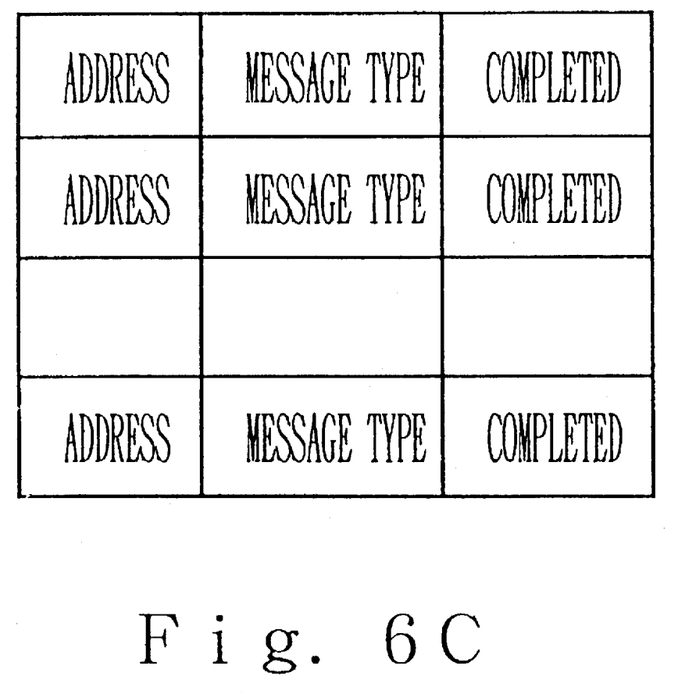
FIG. 6C shows the contents of the message receiving buffer.

FIG. 6C shows the contents of the message receiving buffer 12 containing an address of the message buffer for storing a message received through a network, a message type of the received message, and a completion flag set when the received message has been completely transmitted to a message buffer.

Figure 6D:
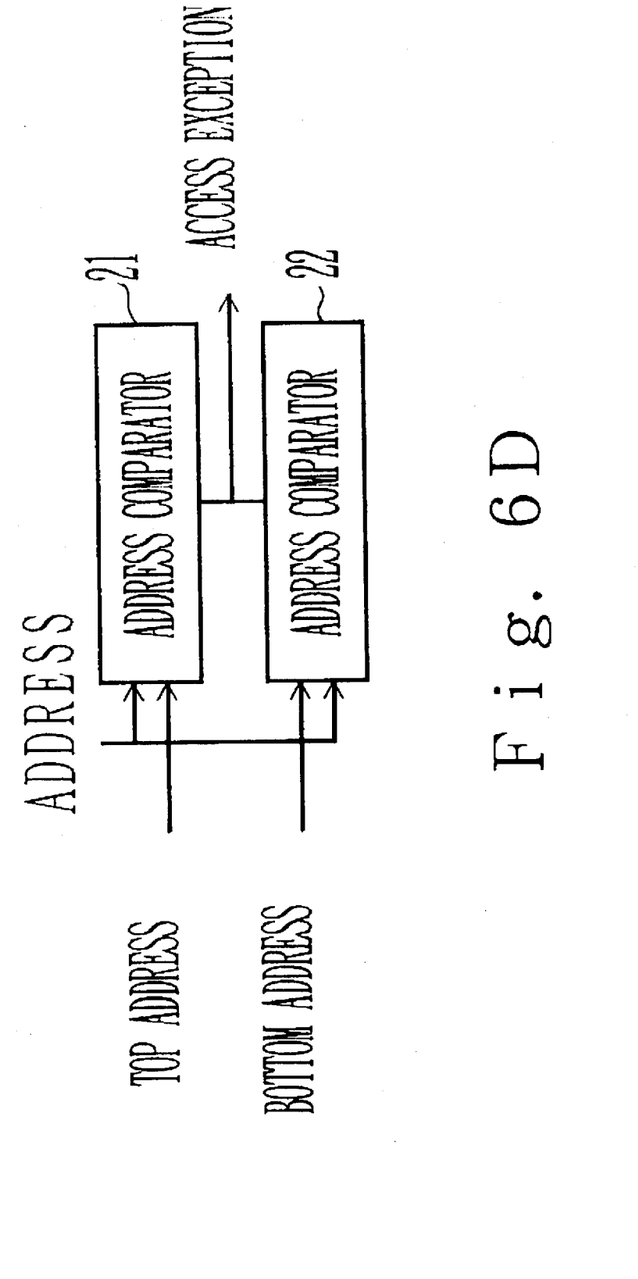
FIG. 6D is the block diagram of the configuration of the access area check unit.

FIG. 6D is the block diagram of the configuration of the access area checking unit 14. In FIG. 6D, the access area checking unit 14 comprises two comparators 21 and 22 for comparing an access address from a processor with a top address and a bottom address respectively, and generates an access exception as an access fault if the access address from the processor is between the top and bottom addresses.

A top address indicates a sum of the address at which the second direct memory access controller (DMAC 2) 18 shown in FIG. 6A starts transmission (that is, the start address of a message storage area) and the size of a message to be transmitted, namely, the end address of the message storage area. A bottom address indicates the address of data to be transmitted next by the DMAC 2. Accordingly, a value between the bottom and top addresses indicates an address at which data has not been transmitted yet, in the user area to which the message is transmitted. If the processor accesses an address within the area between the bottom and top addresses, then the access area checking unit 14 returns an access exception to the processor.

Next, described below is a method of receiving a message according to the present invention. The method depends on the arrival sequence of a receive-a-message request from the processor 2 and the actual arrival of a message through a network. A receive-a-message request and the actual arrival of a message may occur in the following order. First, a receive-a-message request is received before the actual arrival of a message header. Second, a receive-a-message request is received from the processor 2 while an actual message is being received. Third, a receive-a-message request is received from the processor 2 after an actual message has been completely received. A receive-a-message request from the processor 2 contains, as described above, a message type, an address of a user area, and a message size.

Figure 7A:
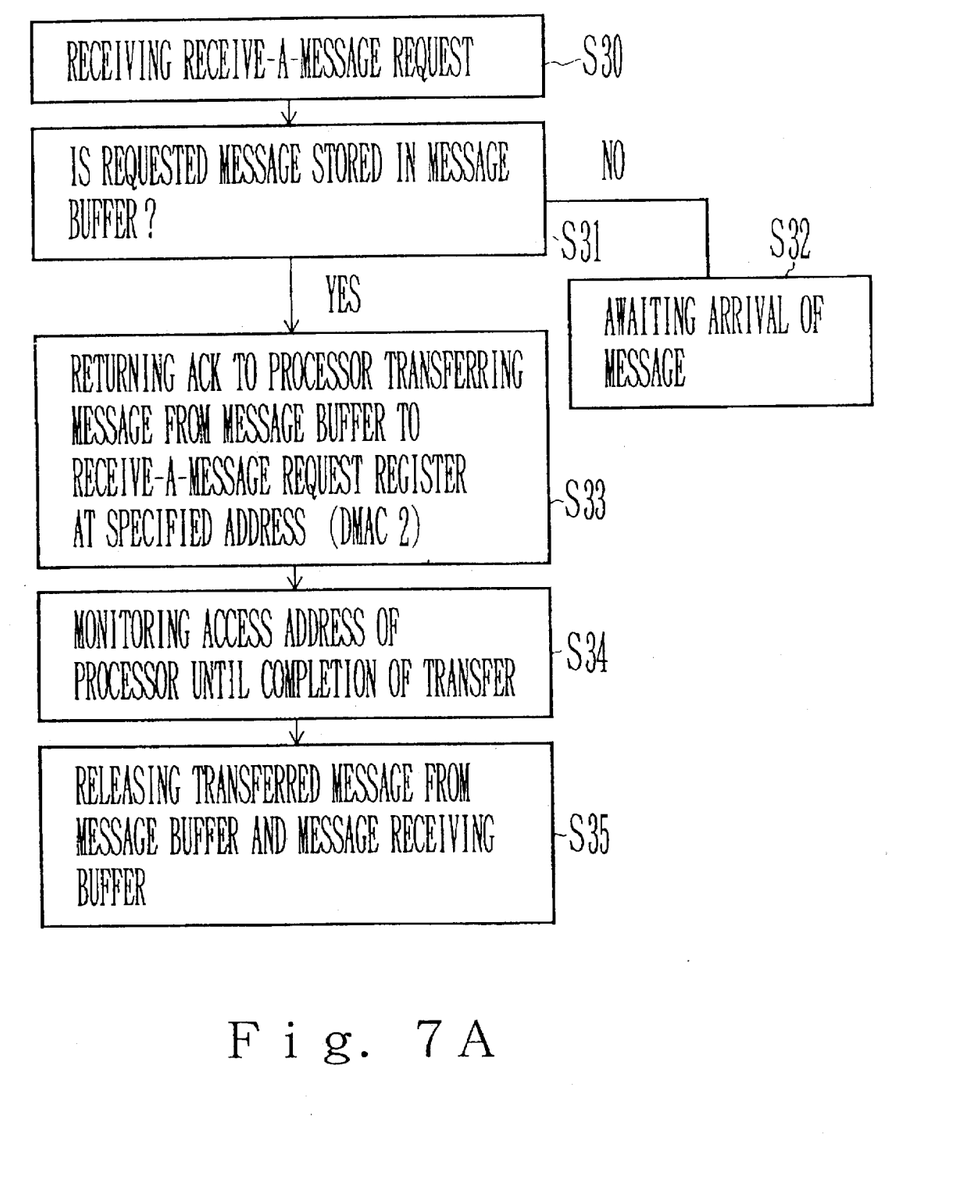
FIG. 7A shows the process algorithm for a receive-a-message request.
Figure 7B:
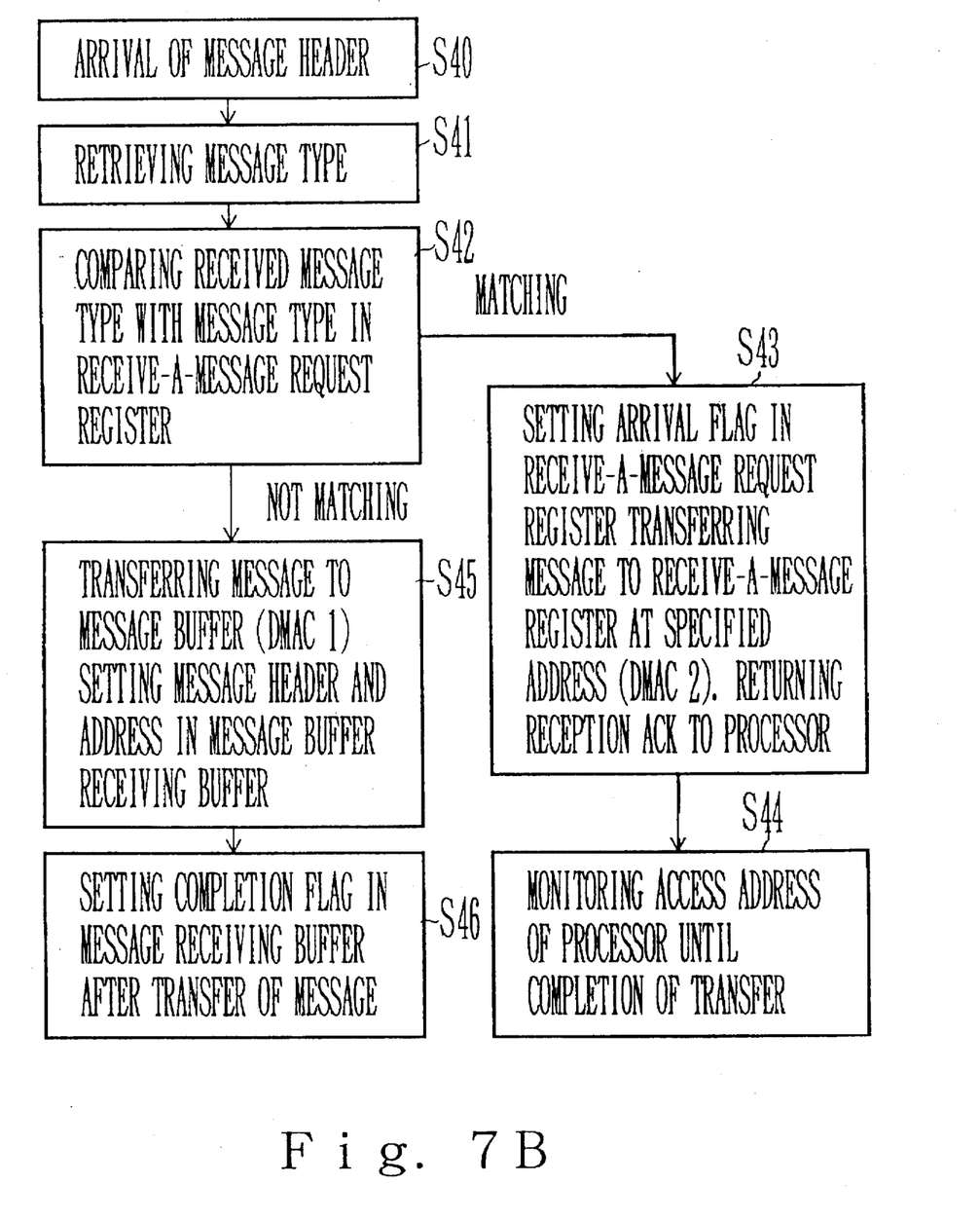
FIG. 7B shows the process algorithm at the arrival of a message.

Explained below by referring to the flowcharts shown in FIGS. 7A and 7B is a process performed by a message handler after receipt of a receive-a-message request. FIG. 7A shows the process algorithm for a receive-a-message request. If a receive-a-message request is received in step S30, it is determined in S31 whether or not the requested message has been stored in a message buffer based on the contents of a message receiving buffer. That is, the message type indicated by the receive-a-message request is compared with the type of the message stored in the message receiving buffer (both messages occupy 32 bits) to check if the message has already been received or is being received.

When a receive-a-message request from a processor is received before the actual arrival of a message header, the type of the message has not been stored in a message receiving buffer, and the actual arrival of the message is awaited in S32.

If the requested message arrives, a process is performed according to the process algorithm shown in FIG. 7B. First, a message header arrives in S40, the message type indicated by the message header is retrieved in S41, and the type of the message is compared with the message type stored in the receive-a-message request register 13. If the types match, then it is considered that the requested message has been received, an arrival flag of the receive-a-message request register is set in S43, and the message is transmitted to a user area at an address specified by the receive-a-message request register by the second direct memory access controller (DMAC 2) 18. Then, an ACK indicating that the requested message has been received, in response to the reception request, is returned to the processor. In S44, the access area checking unit 14 monitors the access address of the processor until the message has been completely transmitted to the user area. The received message is directly transmitted to the user area without being stored in the message buffer.

If the type of the received message is different from that of the message stored in the receive-a-message request register 13 in S42 shown in FIG. 7B, then the message is transferred by the first direct memory access controller (DMAC 1) 17 from the receiving unit 11 to the message buffer, and set are the type of the message transferred to the message receiving buffer 12 and the address at which the message is stored in the message buffer in S45. When the message has been transferred to the message buffer, a completion flag is set in the message receiving buffer in S46.

If the type of the received message is the same as that of the message in the receive-a-message request register, and if the completion flag in the message receiving buffer has not been set yet, that is, if the message is being received, the message handler starts transmitting, that is, copying, the message already stored in the message buffer to the user area. The message searcher 16 determines whether or not the completion flag has already been set. If it is determined that the flag has been set, then data are transmitted by DMAC 2.

In the copying operation, the two direct memory access controllers control the message transmission such that any area to which messages are not transmitted yet in the message buffer is not copied. That is, the transmission is controlled so that the data in the area not transmitted yet by the DMAC 1, which controls the transmission of data to the message buffer, is not copied by the DMAC 2. When data are copied to the user area, a Signal ACK is returned to the processor as in S43, and an access address of the processor is monitored until the message has been completely transmitted to the user area in S44.

On the other hand, in the third case, that is, if a receive-a-message request from the processor 2 to the message handler 3 is received after the requested message has been received, then it is determined in S31 shown in FIG. 7A that the message has been stored in the message buffer, a signal ACK indicating that the message has been received is returned to the processor in S33, the second direct memory access controller (DMAC 2) transmits the message stored in the receive-a-message request register from the message buffer to a transfer address, that is, to the user area, and an access address of the processor is monitored until the message has been completely transmitted in S34 as in S44 described above. If the transmission has been completed, the data storage areas associated with the message in the message buffer, the message receiving buffer, and the receive-a-message request register are released in S35.

In the explanation above, a processor awaits the arrival of a message as defined in S32 shown in FIG. 7A if a receive-a-message request arrives from the processor before the actual arrival of the header of the message. However, the processor can start another process without awaiting the arrival of the message header after issuing the receive-a-message request. In this case, as described above, a message handler detects an access exception when the processor accesses a user area to which the message has not been transmitted, and the processor is repeating accessing the area until the message has been stored in the area. However, the processor can continue another process unless it accesses the area.

Assume that, for example, a processor receives a message specified by a receive-a-message request and performs a process according to the contents of the message, and sends the processing result as a message to another processor. In this case, if the processor issues to a message handler a send-a-message request to another processor before receiving the message, then the message communications may be meaningless. An important point is the order between a sending and a receiving of a message, and the transmission of the message can be realized after confirming the receipt of the message by checking an arrival flag.

If a message handler receives from a processor a send-a-message request, then the message handler checks an arrival flag in a receive-a-message request register before it starts sending the message, awaits the arrival flag to be set if it has not been set yet, and starts sending the message on receipt of the send-a-message request if the arrival flag has been already set, thus maintaining the significance of the message communications. At this time, it is not necessary for the message handler to return an ACK signal to the processor.

The configurations of the first direct memory access controller (DMAC 1) 17 and the second direct memory access controller (DMAC 2) 18 shown in FIG. 6A are described furthermore in detail, and their functions in an access check performed by the access area checking unit 14 is explained as follows.

Figure 8:
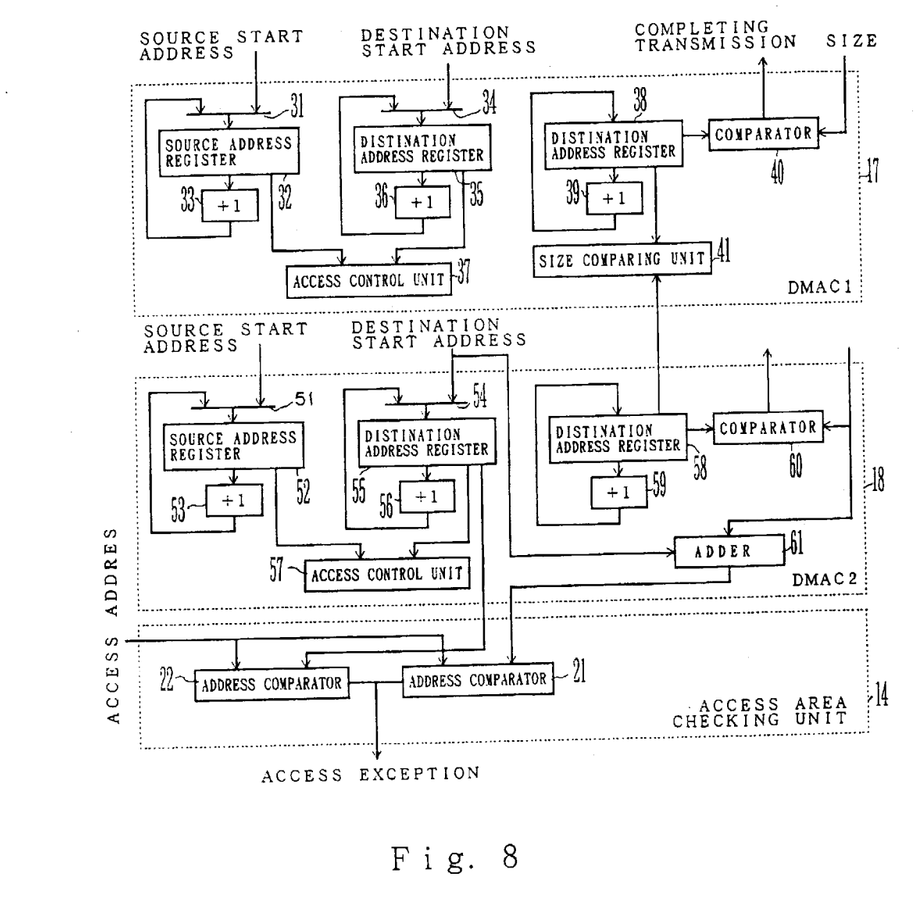
FIG. 8 is a block diagram showing the detailed configuration of the two DMACs 17 and 18.

FIG. 8 is the block diagram showing the detailed configuration of the two DMACs 17 and 18. In FIG. 8, the first direct memory access controller 17 comprises a selector 31 for selecting either a source start address, that is, a start address of transmission data at a data sending equipment, or an output of an incrementer 33 described later, a source address register 32 for indicating an address of the transmission data, the incrementer 33 for incrementing an output of the source address register 32, a selector 34 for selecting either a destination start address, that is, a start address in a data storage area at a data destination, or an output of an incrementer 36 described later, a destination address register 35 for indicating an address of a data destination, the incrementer 36 for incrementing an output of the destination address register 35, an access control unit 37 for fetching transmission data specified by a source address and transmitting them to an address specified by a destination address, a size register 38 for indicating the size of already transmitted data in the entire message to be transmitted, an incrementer 39 for incrementing an output of the size register, a comparator 40 for comparing an output of the size register 38 with the size of a message to be transmitted, and a size comparing unit 41 for comparing the sizes of data to check whether or not the size of the data transmitted by the second direct memory access controller 18 is larger than that of the data transmitted by the first direct memory access controller 17. The configuration of the second direct memory access controller 18 is similar to that of the first direct memory access controller 17 except that it does not include a size comparator.

A source start address, a destination start address, and the size of a message are provided for the first direct memory access controller 17 by the message type comparator 15 shown in FIG. 6A. A transmission completion information is provided for the message type comparator 15 by the comparator 40. That is, if the type of a message stored in the receive-a-message request register 13 does not coincide with that of a message received over a network, then the DMAC 1 is activated by the message type comparator 15, and the message received over the network is transmitted to a message buffer. In this case, the source address is not used and the message data are stored in the message buffer at the address specified by the destination address.

A source start address, a destination start address, and the size of a message are provided for the second direct memory access controller 18 by either of the message type comparator 15 or the message searcher 16, and a transmission completion information is outputted to either of them. That is, if the type of a message received over a network coincides with that of a message stored in the receive-a-message request register 13, then the DMAC 2 is activated by the message type comparator 15 and the received message is directly transmitted to a user's transmission area. Also in this case, a source address is not used.

On the other hand, if it is determined according to the contents of the message receiving buffer 12 that a message specified by a reception request from a processor has been transmitted to a message buffer, then the DMAC 2 is activated by the message searcher 16 and the message data are transmitted from the message buffer to a user area. In this case, the source address is a storage address in the message buffer.

When the DMAC2 is activated and a message is being directly transmitted to a user area or message data are being transmitted from a message buffer, the access area checking unit 14 performs a checking operation, as described above, to prevent any processor from accessing an area to which message data have not been transmitted.

That is, the contents of the destination address register 55 is provided as a bottom address for the address comparator 22 while the adder 61 obtains the sum of a destination start address and a message size, and provides the sum for the address comparator 21. Thus, if an access address of a process is between the bottom address and the top address, then the access area checking unit 14 returns an access exception to the processor.

Figure 9:
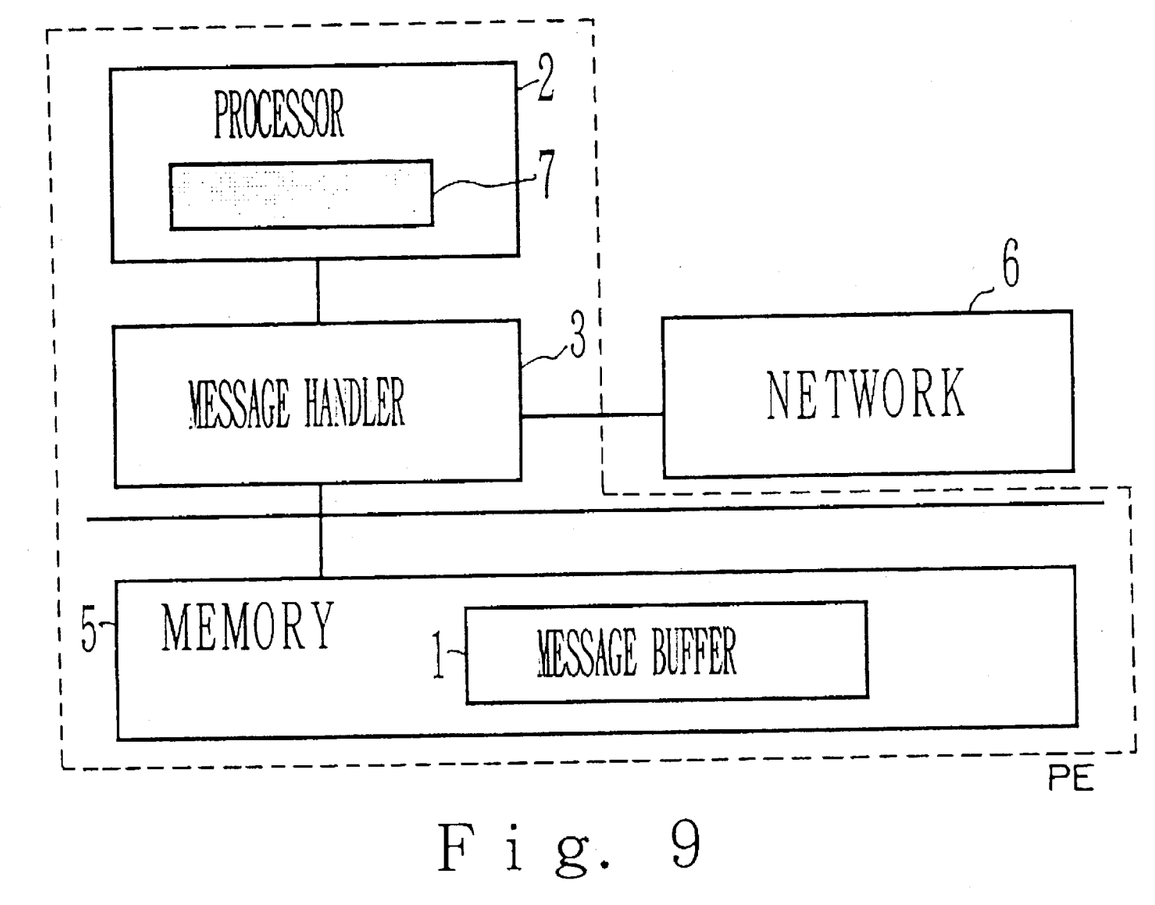
FIG. 9 is the block diagram of the configuration of the processor elements containing a cache memory.

The present invention can be effective when a processor contains a cache memory. FIG. 9 is the block diagram of the configuration of the processor element in which a processor comprises a cache memory. In FIG. 9, if the processor 2 invalidates a message receiving area in an internal cache memory 7 before issuing a receive-a-message request to the message handler 3, then the message handler can check the processor's access to an area to which a message has not been transmitted after an ACK signal is returned to the processor in response to the receive-a-message request, thereby realizing overlap between reception of a message and execution by a processor.

As described above in detail, the present invention realizes overlap between reception of a message and execution by a processor in each computer in a parallel computer system, having a message buffer for temporarily storing a received message, thereby successfully reducing overheads at the reception of messages.

What is claimed is:

1. A parallel computer system having a plurality of computers, each comprising a processor and memory, capable of communicating a message over a network, each computer in said system comprising:

message storing means for temporarily storing a message received from a first computer over the network; and message handler means for receiving a request, from a processor provided in a second computer to which said message handler means belongs, to receive the message to be transmitted from the first computer and temporarily stored in said message storing means, comparing a message type included in the request to receive the message with a message type included in a header of an arrived message, and determining whether or not the arrived message is a message requested from the processor.

2. The parallel computer system according to claim 1, wherein said message handler means comprises access area checking means for checking access of a processor to a portion in the user area in the memory of said second computer, said portion not having received a message but being specified by said request to receive the message.

3. The parallel computer system according to claim 2, wherein said access area checking means stores a bottom address indicating a destination of message data at transmission of next data, and a top address, which is an addition result of a start address of the user area and a size of the message, and checks access to an address between said bottom and top addresses.

4. The parallel computer system according to claim 1, wherein said message handler means comprises a receive-a-message request, register for storing the message type indicated by the request to receive-a-message from the processor, and storing an arrival flag set upon arrival of the message indicated by the request to receive the message from the processor.

5. The parallel computer system according to claim 1, wherein said message handler means comprises:

message receiving buffer means for storing a type of the received message and a destination address of the message in said message storing means, and message searching means for determining whether or not a message requested by a receive-a-message request from the processor has been transmitted to said message storing means.

6. The parallel computer system according to claim 5, wherein said message receiving buffer means further stores a completion flag indicating completion of message transmission to said message storing means, and said completion flag is used to determine that the requested message is being transmitted.

7. The parallel computer system according to claim 1, wherein said message handler means further comprises:

first direct memory access controller means (DMAC 1) for controlling transfer of the message received over the network to said message storing means;

second direct memory access controller means (DMAC 2) for controlling transfer of a message stored in said message storing means or the message received over the network to the user area in the memory of said second computer; and size comparing means for controlling size of data transmitted by said second direct memory access controller means so that it would not exceed a size of data transmitted by said first direct memory access controller means.

8. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive a message to be transmitted from the first computer and temporarily stored in the message buffer, comparing a message type included in the request to receive a message with a message type included in a header of an arrived message, and determining whether or not the arrived message is a message requested from the processor, said method comprising the steps of:

determining by the message handler whether or not a requested message has been received through the network on receipt of a receive-a-message request from the processor; and transmitting the message, if the message has not been received, by the message handler, directly to a user area at a memory address upon actual reception of the message so that overheads for transmission of the message from the message buffer to the user area in the memory of the second computer can be reduced.

9. The message receiving method according to claim 8, wherein after starting transmission of the message by the message handler to the user area, the message handler returns a signal to the processor in response to said receive-a-message request; and the processor is prevented from accessing an area in the user area to which the message has not been transmitted so as to realize overlap between reception of a message and execution by a processor.

10. The message receiving method according to claim 9, wherein said message handler causes an access exception when the processor accesses the area to which the message has not been transmitted; and the processor retries access after transmission of the message to the area to which the message has not been transmitted.

11. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive the message to be transmitted from the first computer and temporarily stored in the message buffer, comparing a message type included in the request to receive a message with a message type included in a header of an arrived message, and determining whether or not the arrived message is a message requested from the processor, said method comprising the steps of:

determining by the message handler whether or not a requested message has been received from the network when a receive-a-message request is made by the processor; and transferring by the message handler a message which has been received in the message buffer for temporary storage so as to reduce congestion of messages in the parallel computer system if the message which is not the one requested by the processor is received from the network after it is determined that the requested message has not been received yet.

12. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive the message to be transmitted from the first computer and temporarily stored in the message buffer, comparing a message type included in the request to receive a message with a message type included in a header of an arrived message, and determining whether or not the arrived message is a message requested from the processor, said buffer comprising the steps of:

determining by the message handler whether or not a requested message has been received from the network on receipt of a receive-a-message request from the processor; and starting by said message handler transmitting the requested message from said message buffer to the user area in the memory of the second computer if the requested message is received before reception of the receive-a-message request, and the message has been completely transmitted to said message buffer;

returning a signal to the processor in response to the receive-a-message request immediately after said starting transferring the message; and preventing the processor from accessing a portion of the user area to which the message has not been transferred yet to realize overlap between reception of a message and execution by a processor.

13. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive the message to be transmitted from the first computer and temporarily stored in the message buffer, comparing a message type included in the request to receive a message with a message type included in a header of an arrived message, and determining whether or not the arrived message is a message requested from the processor, said method comprising the steps of:

determining by the message handler whether or not a requested message has been received from the network on receipt of a receive-a-message request from the processor; and     starting by said message handler transmitting the requested message from said message buffer to the user area in the memory of the second computer if a header of the requested message is received before reception of the receive-a-message request, and the message is being transmitted to said message buffer;

returning a signal to the processor in response to the receive-a-message request immediately after said starting transferring the message; and     preventing the processor from accessing a portion of the user area to which the message has not been transferred yet to realize overlap between reception of a message and execution by a processor.

14. The message receiving method according to claim 13, wherein said message handler simultaneously transfers a message received from the network to the message buffer and transfers the message from the message buffer to the user area so as to shorten a delay time in a message transfer.

15. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive the message to be transmitted from the first computer and temporarily stored in the message buffer, and comparing a message type included in the request to receive a message with a message type included in a header of an arrived message, and determining whether or not the arrived message is a message requested from the processor, said method comprising the steps of:

invalidating by the processor a message receiving area in the cache memory before issuing a receive-a-message request to the message handler;

returning a signal to the processor by the message handler in response to said receive-a-message request after starting transferring the message received over the network to the cache memory; and     preventing the processor from accessing a portion in the cache memory to which the message has not been transferred yet.

16. A message receiving method in a parallel computer system having a plurality of computers, each computer comprising a message buffer for temporarily storing a message received from a first computer over a network and a message handler for receiving a request, from a processor provided in a second computer to which the message buffer belongs, to receive the message to be transmitted from the first computer and temporarily stored in the message buffer, and comparing a message type included in the request to receive a message with a message type included in a header of an arrived message, and determining whether or not the arrived message is a message requested from the processor, said method comprising the steps of:

determining by the message handler whether or not a requested message has been received through the network on receipt of a receive-a-message request from the processor;

starting by the processor another process to cover delay in a process up to receipt of the message if said receive-a-message request is received before actual receipt of the message; and     directly transferring by the message handler the message to the user area when the message actually has been received, and preventing the processor from accessing the user area in which the message is to be stored in a memory of the second computer.

17. The message receiving method according to claim 16, wherein said message handler prevents the processor from accessing the user area, and awaits sending a message to said first computer until actual arrival of the message requested according to the receive-a-message request when the processor issues to the message handler a send-a-message request to send the message to said first computer.

* * * * *